(12) United States Patent
Becker

(10) Patent No.: US 6,754,685 B2
(45) Date of Patent: Jun. 22, 2004

(54) DYNAMIC POPCOUNT/SHIFT CIRCUIT

(75) Inventor: Matthew E. Becker, Montgomery, AL (US)

(73) Assignee: Sun Microsystems, Inc., Santa Clara, CA (US)

( * ) Notice: Subject to any disclaimer, the term of this patent is extended or adjusted under 35 U.S.C. 154(b) by 587 days.

(21) Appl. No.: 09/745,759

(22) Filed: Dec. 21, 2000

(65) Prior Publication Data

US 2002/0083106 A1 Jun. 27, 2002

(51) Int. Cl.$^7$ ................................................. G06F 7/00
(52) U.S. Cl. ................................... 708/209; 708/210
(58) Field of Search ............................... 708/200, 209, 708/210

(56) References Cited

U.S. PATENT DOCUMENTS 4,989,168 A * 1/1991 Kuroda et al. ............. 708/210
5,717,616 A * 2/1998 Morris ....................... 708/210
5,734,599 A * 3/1998 Lee et al. ................... 708/620

* cited by examiner

Primary Examiner—Chuong Dinh Ngo
(74) Attorney, Agent, or Firm—Osha & May L.L.P.

(57) ABSTRACT

A method for integrating population count operations with bit shift operations has been developed. The method can be used for incrementing a pointer by a population count of a sparse vector. The method further provides for balancing the input loads at the inputs of the population count and bit shift circuits so that the execution of operations is more balanced, which, in effect, increases computational speed and efficiency. An apparatus that integrates population count circuitry and bit shift circuitry has also been developed. The apparatus comprises a plurality of dynamic stages followed by static stages. The dynamic stages involve the use of dynamic nodes which represent values dependent upon values of individual bits in the pointer and the sparse vector. The apparatus further allows for an expansion through circuit repetition so that the topology of the apparatus can change according to the size of the pointer and sparse vector.

43 Claims, 13 Drawing Sheets

DYNAMIC POPCOUNT/SHIFT CIRCUIT

FIELD OF THE INVENTION

The present invention relates generally to bit-shift and population counter ("popcount") circuits and more particularly to a dynamic popcount/shift circuit.

BACKGROUND OF THE INVENTION

A computer system typically comprises a processor, which is responsible for executing programs supplied by a user or software. Accordingly, computer processors comprise arithmetic, logic, and control circuitry that interpret and execute instructions from a computer program. Referring to FIG. 1, a typical computer system includes a microprocessor (20) having, among other components, a central processing unit ("CPU") (22), a memory controller (24), and on-board, or Level 1, cache memory (26). Additionally, the microprocessor (20) is connected to external, or Level 2, cache memory (28) and a main memory (30). Typically, the three units of memory (26, 28, 30) all hold data and program instructions to be executed by the microprocessor (20). Internally, the execution of program instructions is carried out by the CPU (22). When instructions call for data operations to be carried out, the data is fetched by the memory controller (24) and loaded into internal registers (32) within the CPU (22). Upon command from the CPU (22), the memory controller (24) first searches for the needed data in the fast on-board cache (26), and if the memory controller (24) is unsuccessful locating the data in the on-board cache (26), then it searches next in the slower external cache (28). In the case that the memory controller (24) doesn't find the data in the external cache (28), then it must retrieve the data from the main memory (30), which is significantly slower than both forms of cache memory (26, 28).

A computer system's memory comprises thousands of sequential storage locations, and each location is identified by a unique address. The memory addresses in a given computer usually range from 0 to a maximum value that depends on the amount of memory the system has installed.

In order for a program to be executed by a computer system, the program must be divided into individual instructions, which are recognizable by a processor. These instructions are first decoded by the processor in order for the processor to determine the type of operation that is needed for executing the instruction. The processor then executes the instruction by performing the operation on the data specified by the instruction. If the data is not already in the CPU, then the CPU, as described above, must retrieve the data via the memory controller. The individual instructions usually do not reside in contiguous memory locations. An instruction address is used to determine where a particular instruction resides in memory. Moreover, the data needed by a CPU to execute the instruction also do not usually reside in contiguous memory locations. Therefore, data, needed by the CPU, is usually referenced by the memory location address where it resides.

Typically, a program defines data by variables so that it can use the variable names instead of the actual data values that the variables represent. When a data value is defined by a variable, the memory system assigns the variable the memory location where the data resides. Hence, in a program, an instruction may reference a data value by its memory location instead of by referencing the variable that represents the data. This is advantageous because it allows a user to directly access a memory address. Because a memory address is a number, instructions often store the memory address in a variable called a pointer. Therefore, it follows that a pointer is a variable that holds the address of another variable.

A pointer can be incremented to reference other memory addresses. The amount by which a pointer increments can be based on a population count ("popcount") of a sparse vector. A sparse vector is a vector having a relatively small number of nonzero elements. In other words, a sparse vector is a vector in which most of the elements are zero.

Popcount circuitry outputs the number of "1" bits in an input word, e.g., the population count ("popcount") value of 110111011 is 7 and the popcount value of 0111101011010110 is 10. A popcount is performed on a sparse vector to determine the amount of nonzero elements within the sparse vector. Using the popcount value, a pointer can be incremented by shifting the pointer value by a number of bit positions equal to the amount of the popcount value. For example, if a sparse vector is 8 bits wide, then by performing a popcount on the sparse vector, a pointer can increment by shifting somewhere between 0 and 8 bit positions.

FIG. 2 is a block diagram of a three-stage popcount/shift circuit (33) designed to increment an 8-bit pointer ("P") using an 8-bit sparse vector ("V"). The first stage comprises two parallel 4-bit popcount blocks (34, 36) that both perform 4-bit popcount operations on V. When the two 4-bit popcount blocks (34, 36) complete their respective 4-bit popcount operations, each 4-bit popcount block (34, 36) generates 5 bits that denote the popcount values for the 4-bit popcount operations performed by the two 4-bit popcount blocks (34, 36).

The second stage of the three-stage popcount/shift circuit (33) comprises a first 4-bit shift block (38) that performs a 4-bit shift operation on 8 bits from P based on the 5 bits generated by the first 4-bit popcount block (34) in the first stage. When the first 4-bit shift block (38) completes its 4-bit shift operation, the first 4-bit shift block (38) generates 12 bits to represent the shifted pointer value according to the 4 bits in V that were popcounted by the first 4-bit popcount block (34) in the first stage.

The third stage of the three-stage popcount/shift circuit (33) comprises a second 4-bit shift block (40) that uses the 12 bits generated by the first 4-bit shift block (38) and the 5 bits generated by the second 4-bit popcount block (36) to perform a 4-bit shift operation on those 12 bits to generate a 16 bit shifted pointer ("PS"). PS represents the pointer value that results when P is incremented by the population count value of V. Other prior art embodiments may use pointers and sparse vectors that are represented by a different amount of bits than the number of bits used in the preceding description.

SUMMARY OF THE INVENTION

In one aspect, the invention relates to a method for integrating population count operations with bit shift operations. This integration of population count operations with bit shift operations allows for increased efficiency when performing these types of operations.

In another aspect, the invention relates to a method for incrementing a pointer vector by a population count on a sparse vector. Oftentimes, a pointer is increased by the population count of a sparse vector, and this invention allows a pointer to be incrementing by shifting sets of bits from the pointer using population counts on sets of bits from a sparse vector. The vector can be divided into an indefinite amount of sets based on the amount of bits in the pointer and the amount of bits in the sparse vector.

In another aspect, the invention relates to a method for balancing loads at inputs of circuits so that the amount of bits remaining to be population counted at a certain time is reduced. By reducing the amount of bits left to be population counted, the speed of the circuit that performs population count and bit shift operations is increased.

In another aspect, the present invention balances the population count operations and bit shift operations such that they occur in parallel. This leads to a savings in computation time and resources.

In another aspect, the present invention relates to an apparatus that integrates population count circuitry with bit shift circuitry. Through this integration, separate circuitry for each type of operation is not necessary.

In another aspect, the present invention relates to an apparatus that comprises dynamic and static components such that the apparatus is able to generate values for bit positions in a shifted bit vector.

Other aspects and advantages of the invention will be apparent from the following description and the appended claims.

DETAILED DESCRIPTION OF THE INVENTION

The present invention relates to a system that dynamically increments a pointer by shifting multiple sets of pointer bits in parallel based on a population count ("popcount") of a sparse vector. The invention also relates to a method for integrating the function of a popcount circuit with a shift circuit in order to balance the performance of popcount and shift operations and to reduce the number of sparse vector bits remaining to be counted at a certain time. Further, the method allows performing popcount and shift operations in parallel so that the number of stages needed to complete the entire popcount/shift operation is reduced.

Figure 1:
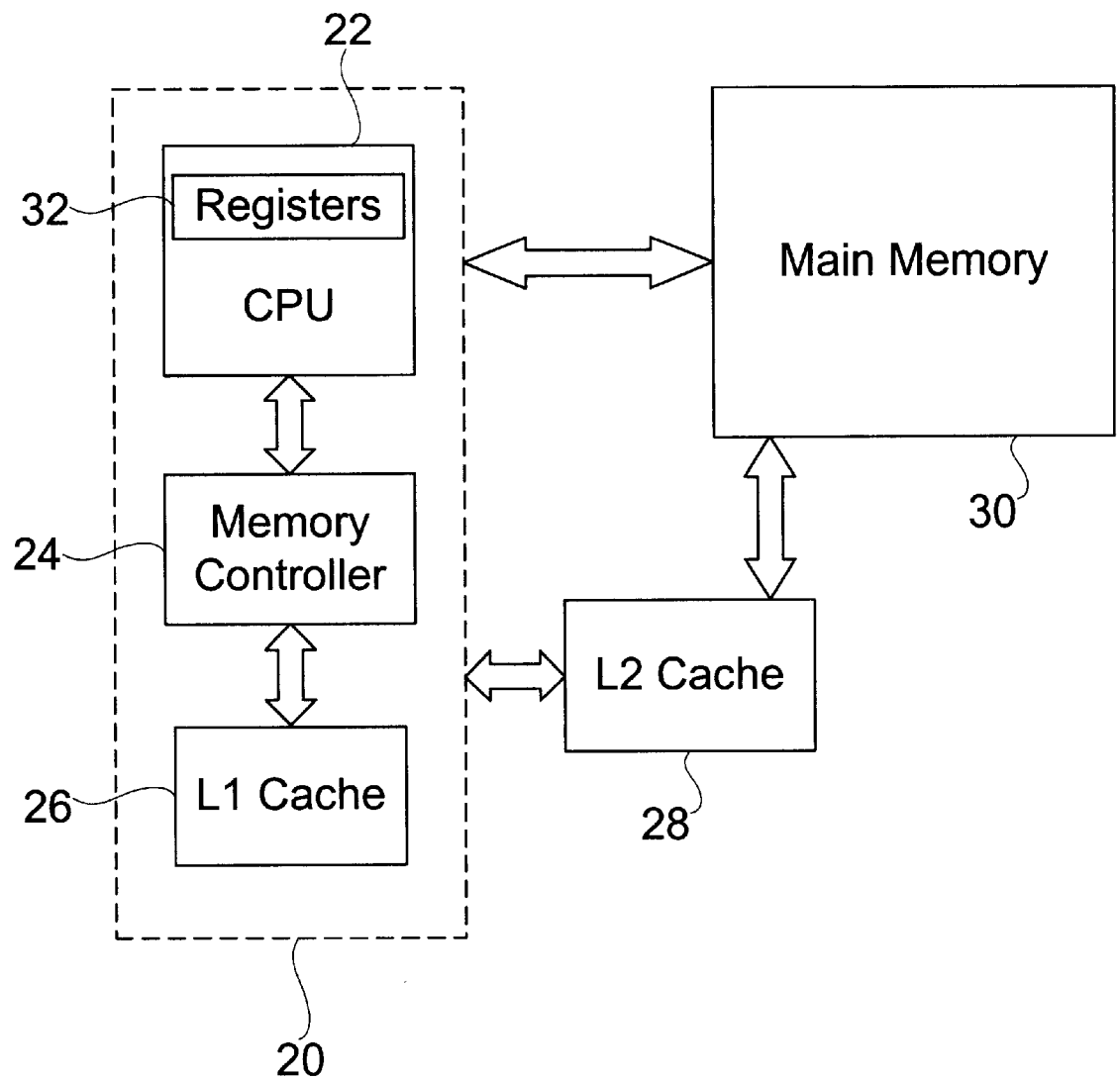
FIG. 1 shows a typical computer system.
Figure 2:
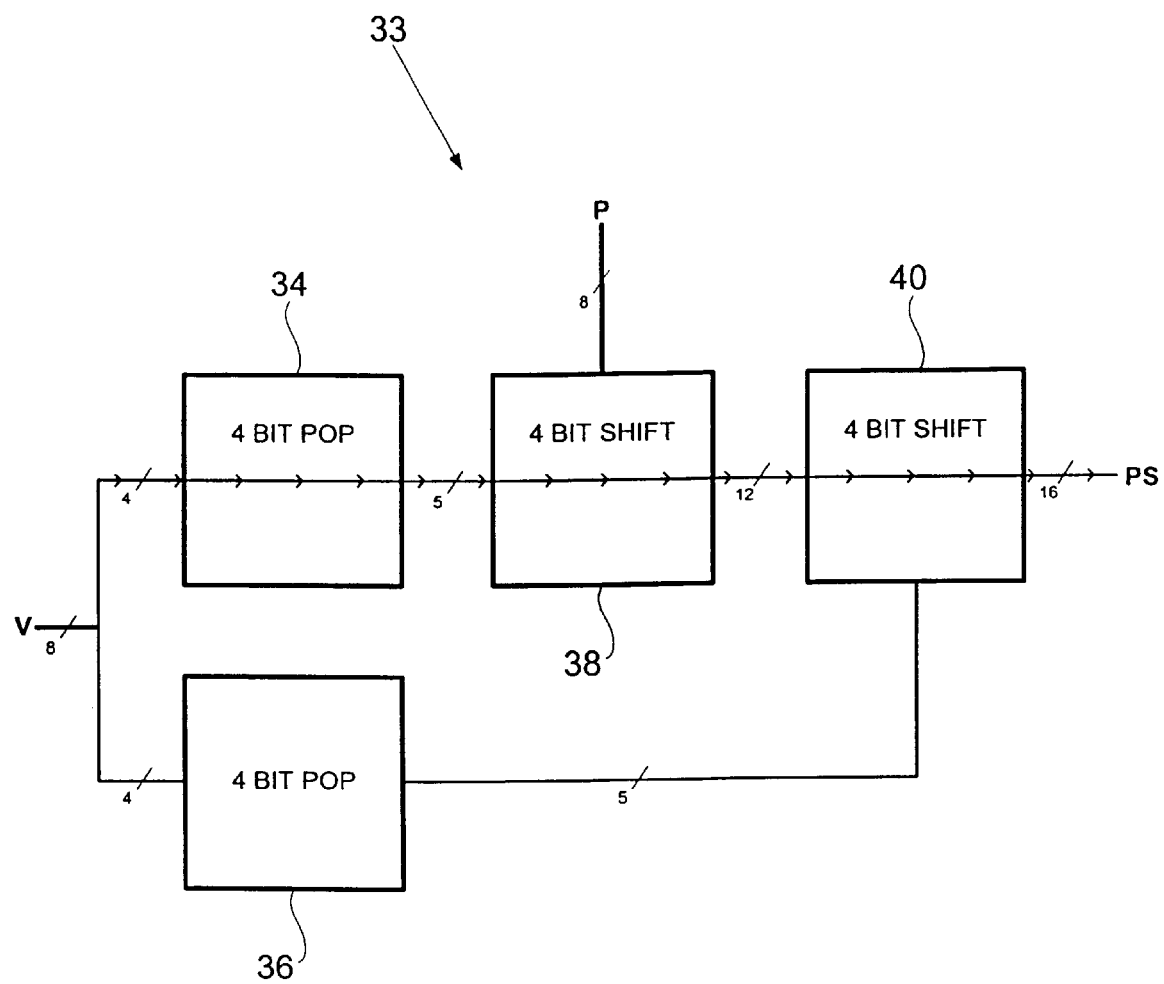
FIG. 2 is a block diagram of a prior art popcount/shift circuit.
Figure 3:
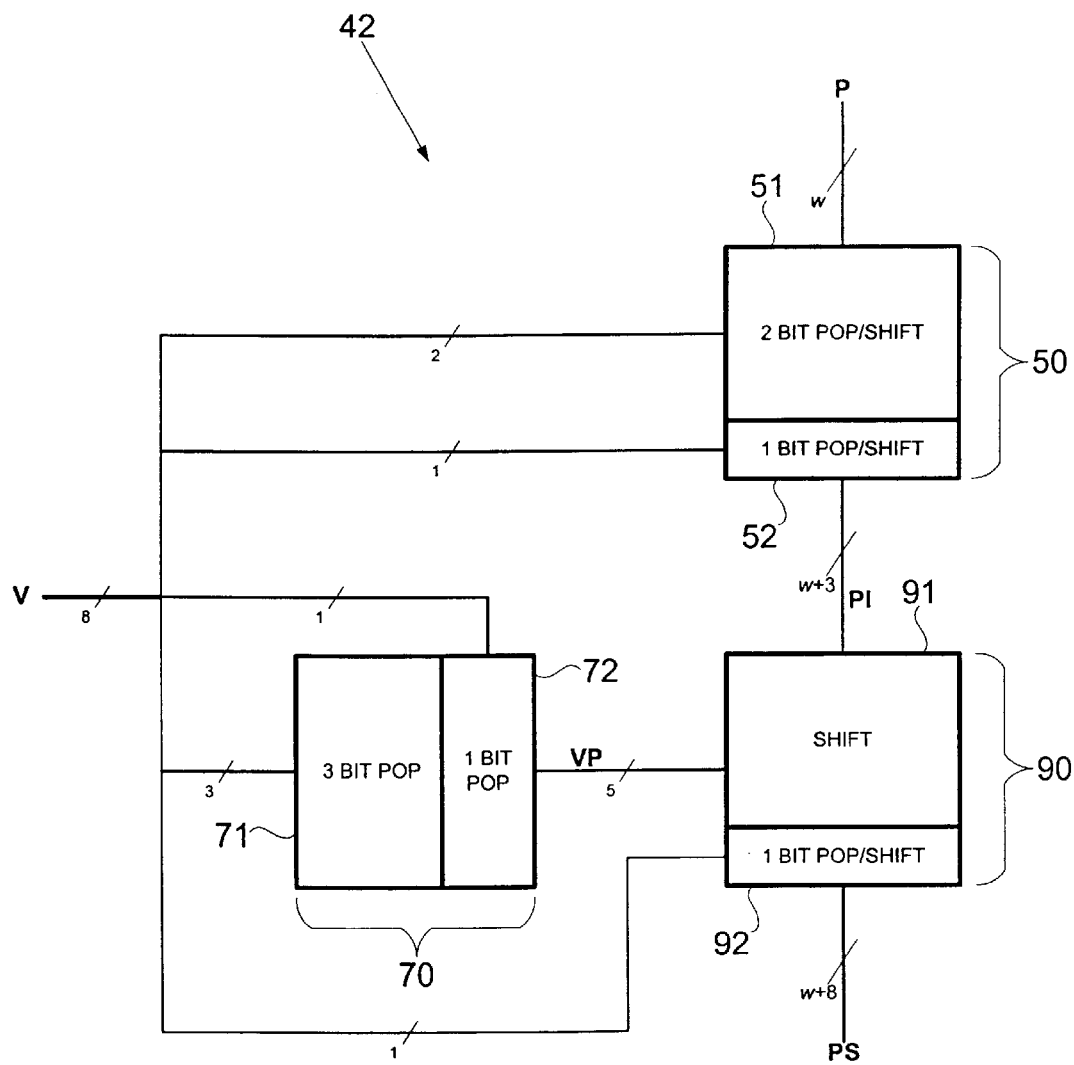
FIG. 3 is a block diagram of a popcount/shift circuit in accordance with an embodiment of the present invention.

Referring to the drawings wherein like reference characters are used for like parts throughout the several views, FIG. 3 is a block diagram of an exemplary embodiment of the present invention is shown. FIG. 3 depicts a two-stage popcount/shift 70, 90). In this exemplary embodiment, a stage comprises dynamic circuitry followed by static circuitry. Each functional block (50, 70, 90) comprises circuitry that performs one or more of the following types of operations: popcount, shift, or popcount/shift. A more detailed description of the circuitry within the functional blocks (50, 70, 90) is given in the discussion below with references to FIGS. 4, 5, 6, 7, 8, 9, 10, 11, 12, and 13. Two input words, i.e., bit vectors, serve as inputs to the popcount/shift circuit (42) shown in FIG. 3. The first input word is a pointer value ("P") that is eventually incremented by the value of a population count on the second input word, a sparse vector ("V"). P has a width of w, where w is the number of bits used to represent P. Further, in this exemplary embodiment, V is an 8-bit sparse vector. However, those skilled in the art will appreciate that in other embodiments the sparse vector may be represented by a different amount of bits. Also, those skilled in the art will appreciate that in other embodiments the popcount/shift circuit may use a different amount of stages.

The first functional block (50) performs a 2-bit popcount/shift operation (51) followed by a 1-bit shift operation (52). Both operations (51, 52) use P as an input. In addition, the 2-bit popcount/shift operation (51) uses two bits from V and the 1-bit shift operation (52) uses one bit from V. Once the operations (51, 52) complete, the first functional block (50) generates a pointer-intermediate vector ("PI"). PI is a shifted pointer value with respect to P based on the popcount value of the three bits in V that the first functional block uses (50). Accordingly, PI has a width of w+3 since P may shift a total of three bit positions. For example, if P has a value represented by 1011, and if two of the three bits that the first functional block (50) uses are high, then PI is generated as 0101100 since P is shifted two bit positions.

The second functional block (70) performs a 3-bit popcount operation (71) followed by a 1-bit popcount operation (72). The 3-bit popcount operation (71) uses three bits from V and the 1-bit popcount operation (72) uses one bit from V. The second functional block (70) outputs five data bits, which constitute the vector-pop vector ("VP"). VP represents the population count value of the bits in V that are popcounted by the second functional block (70). The second functional block (70) uses a total of four bits from V, and correspondingly, VP is represented using five data bits due to the fact that there may be 0, 1, 2, 3, or 4 high bits in the four bits in V that the second functional block (70) uses. For example, if 2 of the 4 bits are high, then VP is represented by 00100. The '1' in the third bit position of VP ($VP_2$) indicates that 2 of the 4 bits that the second functional block (70) uses are high. Likewise, if all 4 bits are high, then VP is represented by 10000, wherein the '1' in the fifth bit position of VP ($VP_4$) indicates that all 4 bits are high. Those skilled in the art will appreciate that in other embodiments, the second functional block (70) may use a different amount of bits from V, and therefore, this would result in VP being represented by a different amount of bits. Also, other embodiments may use a different representation of VP to indicate the popcount value of the bits used by the second functional block (70).

The third functional block (90) performs a shift operation (91), which is dependent upon bit values in VP, followed by a 1-bit shift operation (92). The two operations (91, 92) use the five bits in VP and one bit from V. Additionally, the third functional block (90) inputs PI, shifts PI according to the bit values in VP and the value of the one bit from V, and generates a shifted-pointer vector ("PS"). The third functional block (90) may shift PI a total of five bit positions based on the popcount value of the four bits used by the second functional block (70) and the one bit used directly from V by the 1-bit shift operation (92). Accordingly, PS is represented using w+8 bits. PS represents the pointer value that results when P is incremented by the population count value of V using the two-stage dynamic popcount/shift circuit (42) block diagram shown in FIG. 3. For example, if the value of PI is represented by 0101100, and VP is represented by 01000, then the third functional block (90) generates PS as 0000101100000 since PI is shifted three bit positions.

Figure 4:
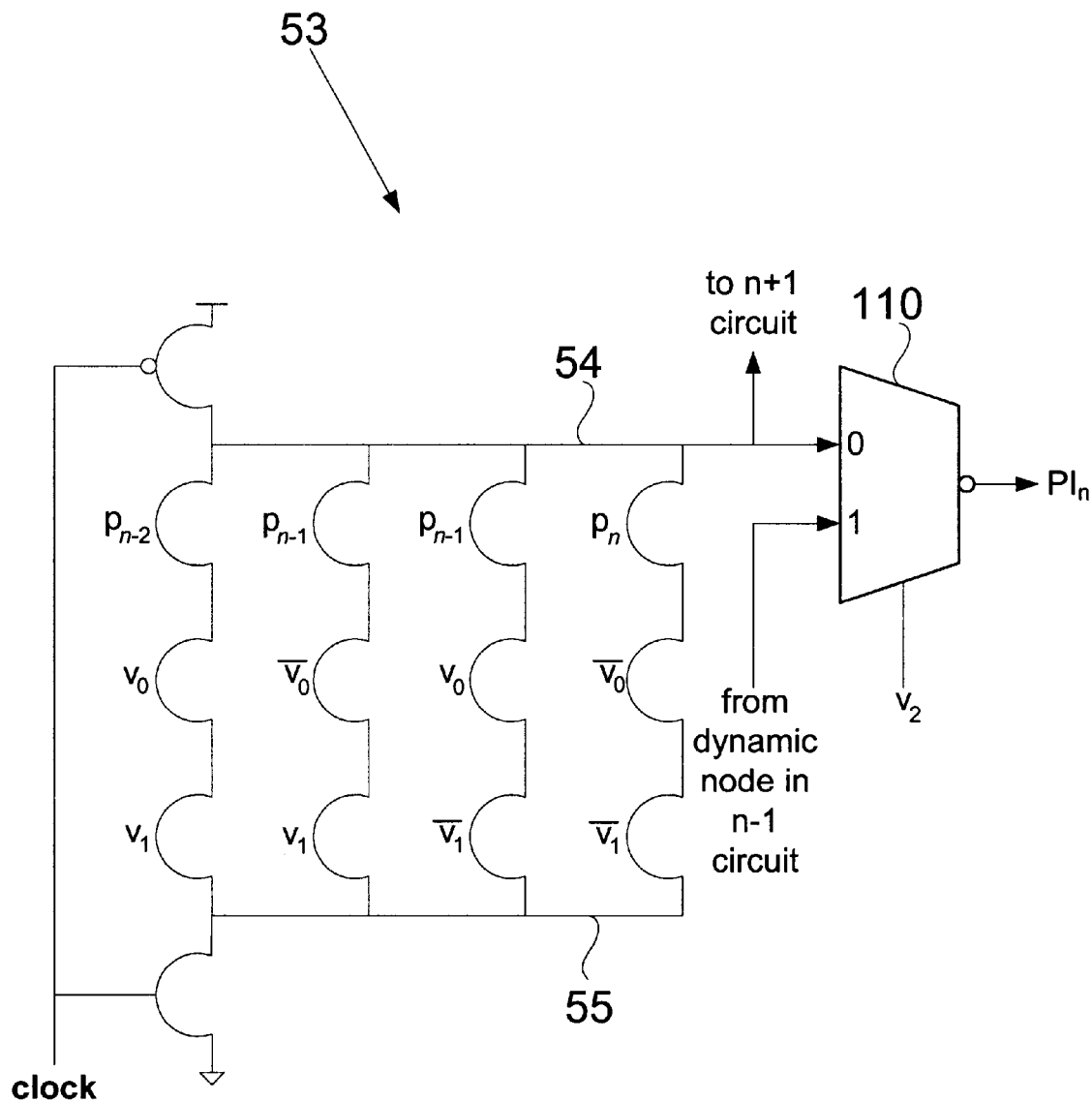
FIG. 4 shows a circuit within a functional block of a popcount/shift circuit in accordance with an embodiment of the present invention.

FIG. 4 shows a circuit (53) of the first functional block (90) in an exemplary embodiment of the present invention. This circuit (53) is replicated w+3 times within the first functional block (90), wherein w is the number of bits used to represent the pointer vector ("P") (discussed above). The circuit (53) generates the nth bit in a pointer-intermediate vector ("PI") (discussed above). For example, if the value of n for the circuit (53) is 0, then the circuit (53) generates the $1^{st}$ bit in PI ($PI_0$). Further, the circuit (53) uses three bits ($v_0$, $v_1$, $v_2$) from a sparse vector ("V") (discussed above) and bits from P ($p_{n-2}$, $p_{n-1}$, $p_n$) based on the value of n for the circuit (53).

The circuit (53) comprises a dynamic node (54) and a virtual ground node (55). The value of the dynamic node (54) is determined by strings of devices ($p_{n-2}$-$v_0$-$v_1$, $p_{n-1}$-$\overline{v_0}$-$v_1$, $p_{n-1}$-$v_0$-$\overline{v_1}$, $p_n$-$\overline{v_0}$-$\overline{v_1}$) within the circuit (53). The virtual ground node (55) is connected to ground, and therefore, the virtual ground node (55) has a value of 0. Additionally, the circuit (53) has a clock terminal that is used for operation timing purposes. Typically, a dynamic node is pre-charged to a certain value and its subsequent values are determined by additional circuit behavior.

The value of the dynamic node (54) is high ("1") unless the dynamic node (54) is connected to the virtual ground node (55) in the case that one or more strings of devices represent a short circuit, i.e., a wire. Each of the devices shown in the circuit (53) either is high ("1") or low ("0") depending upon the value it represents. If a device has a value of 1, then the device represents a short circuit. On the other hand, if a device has a value of 0, then the device represents an open circuit. Therefore, when one device in a string is low, the string containing that device represents an open circuit, and the value of the dynamic node (54) is not affected by that string. However, in the case that all the devices in a string are high, that string represents a short circuit, and consequently, the dynamic node (54) is connected to the virtual ground node (55), and the value of the dynamic node (54) goes to 0.

Once the value of the dynamic node (54) is determined, the dynamic node (54) value serves as an input to a static multiplexor (110) (discussed below with reference to FIG. 5). The static multiplexor (110) has two data inputs ("Input 0,""Input 1") and one select input ("Select Input").

The value of the dynamic node (54) serves as Input 0 to the static multiplexor (110), and the dynamic node (54) value is also used by a circuit (not shown) that generates a nth+1 bit in PI (shown in FIG. 4). In the case that the value of n for the circuit (53) represents the most significant bit in PI, the value of the dynamic node (54) can only be used as an input to the static multiplexor (110) for the circuit (53).

For Input 1, the static multiplexor (110) uses the value of the dynamic node from a circuit (not shown) that generates a nth−1 bit in PI (shown in FIG. 4). In the case that the value of n for the circuit (53) represents the least significant bit in PI, Input 1 is hard-wired to a value of '1.' Those skilled in the art will appreciate that in other embodiments, the value of Input 1 may be hard-wired to a value of '0' in the case that the value of n for the circuit (53) represents the least significant bit in PI.

The Select Input of the static multiplexor (110) uses the value of a third sparse vector bit ($v_2$). Using the values at Input 0, Input 1, and Select Input, the static multiplexor (110) outputs the value of the nth bit in PI ($PI_n$).

Figure 5:
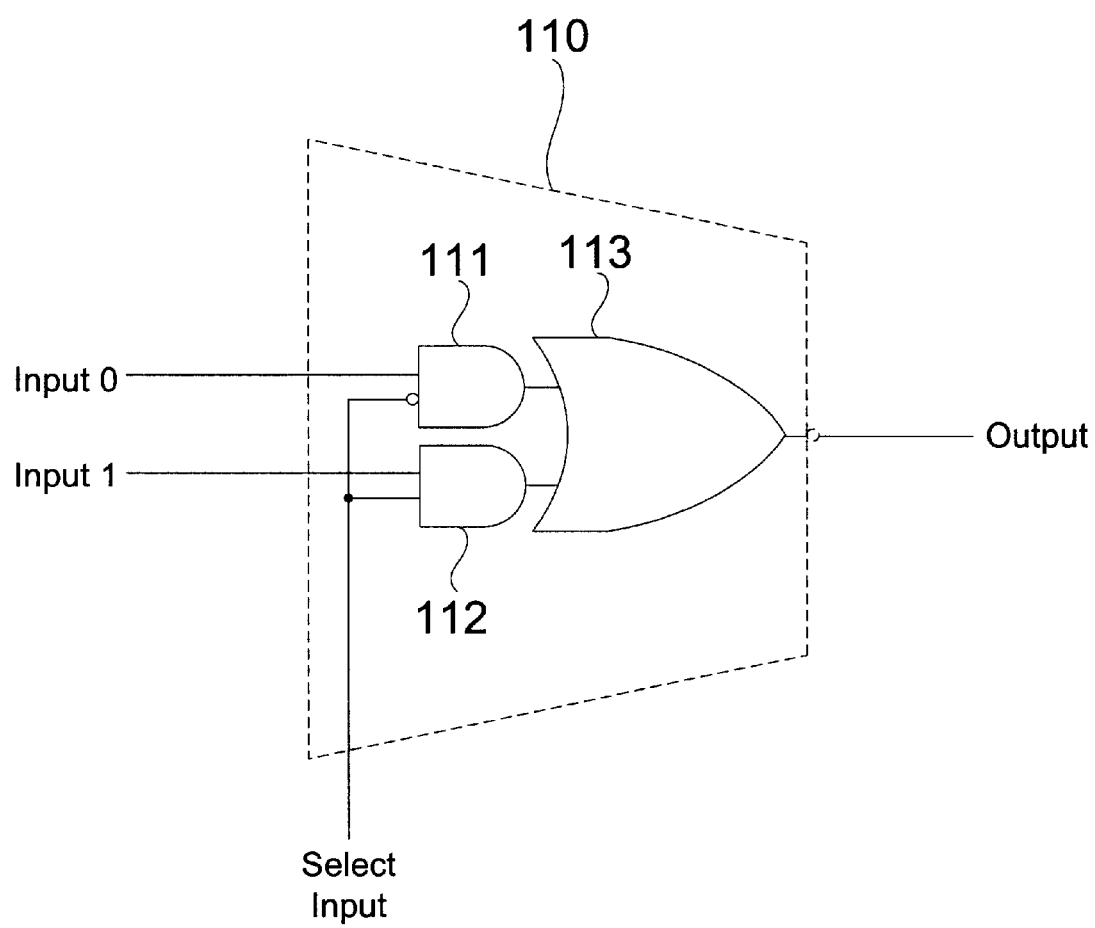
FIG. 5 shows a logic gate diagram of a component of a popcount/shift circuit in accordance with an embodiment of the present invention.

Referring to FIG. 5, a static multiplexor (110) of an exemplary embodiment of the present invention is shown. The static multiplexor (110) is used to output a bit value into a shifted bit or popcount vector. The static multiplexor (110) comprises two AND gates (111, 112) in parallel that are in series with a OR gate (113). Input 0, which serves as one input to the first AND gate (111), comes directly from a circuit (not shown) whose n value is the same as the bit position that the static multiplexor (110) is currently outputting to. The second input to the first AND gate (112) is the complement value of Select Input.

Select Input has the value of one of the bits in a sparse vector. The first input to the second AND gate (112) is Input 1. Input 1 comes from a circuit (not shown) that has a n value equal to one bit position less than the bit position the static multiplexor (110) is currently outputting to. Select Input serves as the second input to the second AND gate (112).

The outputs of both AND gates (111, 112) serve as inputs to the OR gate (113). Thereafter, the OR gate (113) outputs a bit value. This bit value gets inverted at the output of the static multiplexor (110) and is placed into a shifted bit vector based on the outputs of the two AND gates (111, 112).

To summarize, if Select Input is high ("1"), then the second AND gate (112) is selected, and the value at Input 1 determines, via the OR gate (113) and the inversion at the output of the static multiplexor (110), the value at the output of the static multiplexor (110). Else if Select Input is low ("0"), then the first AND gate (111) is selected, and the value at Input 0 determines, via the OR gate (113) and the inversion at the output of the static multiplexor (110), the value at the output of the static multiplexor (110).

Figure 6:
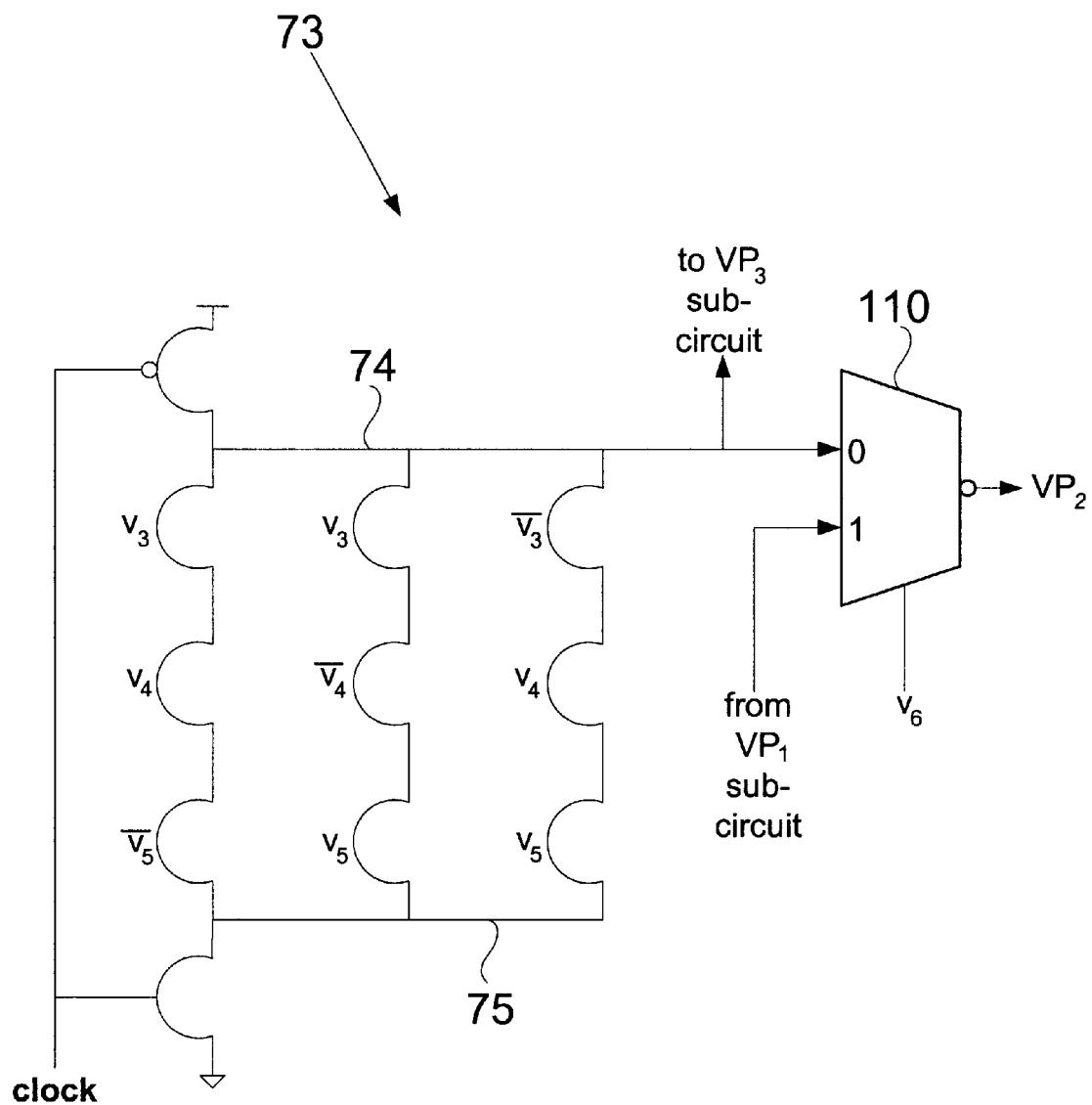
FIG. 6 shows a circuit within a functional block of a popcount/shift circuit in accordance with an embodiment of the present invention.

FIG. 6 shows a popcount circuit (73) of the second functional block (70) in an exemplary embodiment of the present invention. Typically, the second functional block (70) comprises m of these popcount circuits (73), where m+1 is the amount of bits the second functional block (70) generates (discussed below with references to FIG. 10 and 11). For example, if the second functional block (70) popcounts four bits ($v_3$, $v_4$, $v_5$, $v_6$) in a sparse vector, the second functional block (70) uses five (m+1) bits to generate the result of the popcount operations performed within the second functional block (70) since there may be 0, 1, 2, 3, or 4 high bits. Accordingly, the second functional block (70) comprises four (m) of these popcount circuits (73) in addition to additional circuitry. In this exemplary embodiment, the popcount circuit (73) generates the third bit in VP ($VP_2$).

The popcount circuit (73) comprises a dynamic node (74) and a virtual ground node (75). Additionally, the circuit (53) has a clock terminal that is used for operation timing purposes. The value of the dynamic node (74) is high ("1") unless one of the strings of devices within the popcount circuit (73) represents a short circuit. In order for one string of devices to represent a short circuit, exactly two of the bits used in the string must be high ("1") and the third bit must be low ("0"). For example, in FIG. 6, if $v_3$ is low, and $v_4$ and $v_5$ are high, then the string that contains $\overline{v_3}$, $v_4$, and $v_5$ is represented by a short circuit, and consequently, the dynamic node (74) is connected to the virtual ground node (75). Therefore, in order to affect the value of the dynamic node (74) in the popcount circuit (73) that generates the third (x+1) bit in VP ($VP_2$), exactly two (x) bits must be high in a string of devices within the popcount circuit (73). The same relationship between the bit position that the popcount circuit (73) is outputting to and the amount of bits that must be high in a string of devices in order to affect the dynamic node (74) is true for other popcount circuits (not shown) in the second functional block (70).

The dynamic node (74) of the popcount circuit (73) in FIG. 6 serves as Input 0 to a static multiplexor (110). In this exemplary embodiment, the static multiplexor (110) has the same configuration as given in the discussion with reference to FIG. 5. The value of the dynamic node (74) is also used by a popcount circuit (not shown) that generates the bit value for the fourth bit position in VP ($VP_3$).

Input 1 of the static multiplexor (110) has the value of the dynamic node of a popcount circuit (not shown) that generates the second bit in VP ($VP_1$). In the case that that a popcount circuit is generating the least significant bit in VP ($VP_0$), Input 1 is hard-wired to a value of '1.' Those skilled in the art will appreciate that in other embodiments, the value of Input 1 may be hard-wired to a value of '0' in the case that the popcount circuit is generating the least significant bit in VP.

The static multiplexor (110) uses a bit from V ($v_6$) as its Select Input. Accordingly, the static multiplexor (110) uses the values at Input 0, Input 1, and Select Input to generate the value of the bit in the third bit position of VP ($VP_2$). Those skilled in the art will appreciate that although the discussion with reference to FIG. 6 primarily deals with one popcount circuit, the discussion also applies to additional popcount circuits within the second functional block (70).

Figure 7:
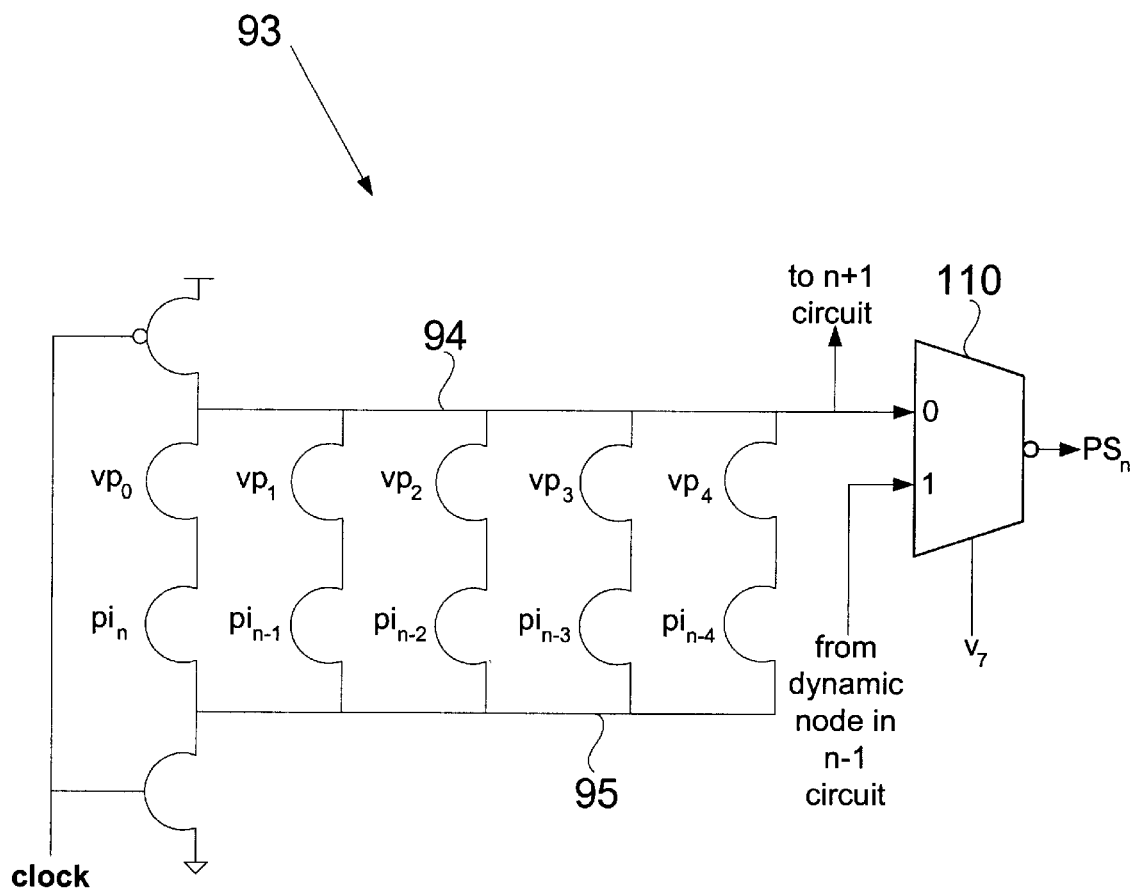
FIG. 7 shows a circuit within a functional block of a popcount/shift circuit in accordance with an embodiment of the present invention.

FIG. 7 shows a circuit (93) of the third functional block (90) in an exemplary embodiment of the present invention. The third functional block (90) comprises w+8 of these circuits (93), wherein w is the amount of bits used to represent P. The circuit (93) generates the nth bit in a shifted-pointer vector ("PS") (discussed above). For example, if the value of n for the circuit (93) is 0, the circuit (93) generates the $1^{st}$ bit in PS ($PS_0$). Further, the circuit (93) uses the five bits from VP ($vp_1$, $vp_2$, $vp_3$, $vp_4$, $vp_5$) and five bits ($pi_{n-4}$, $pi_{n-3}$) $pi_{n-2}$, $pi_{n-1}$, $pi_n$) from PI, where n is the n value for the circuit (93).

The circuit (93) comprises a dynamic node (94) and a virtual ground node (95). The value of the dynamic node (94) is determined by five strings of devices within the circuit (93). In this exemplary embodiment, each string comprises two devices. The virtual ground node (95) is connected to ground, and therefore, the virtual ground node (95) has a value of 0. Additionally, the circuit (93) has a clock terminal that is used for operation timing purposes.

The value of the dynamic node (94) is high ("1") unless the dynamic node (94) is connected to the virtual ground node (95) in the case that one or more strings of devices within the circuit (93) represent a short circuit, i.e., a wire. Each of the devices shown in the circuit (93) is either high ("1") or low ("0") depending upon the value it represents. If a device within the circuit (93) has a value of 1, then the device represents a short circuit. On the other hand, if a device has a value of 0, then the device represents an open circuit. Therefore, when one device in a string is low, the string represents an open circuit, and the value of the dynamic node (94) in not affected by that string. However, in the case that all the devices in a string are high, that string represents a short circuit, and consequently, the dynamic node (94) is connected to the virtual ground node (95), and the value of the dynamic node (94) goes to 0.

The value of the dynamic node (94) serves as Input 0 to a static multiplexor (110), and the dynamic node (94) value is also used by a circuit (not shown) that generates a nth+1 bit in PS (shown in FIG. 7). In the case that the value of n for the circuit (93) represents the most significant bit in PS, the value of the dynamic node (94) can only be used as an input to the static multiplexor (110) for the circuit (93).

For Input 1, the static multiplexor (110) uses the value of the dynamic node from a circuit (not shown) that generates a nth−1 bit in PS (shown in FIG. 7). In the case that the value of n for the circuit (93) represents the least significant bit in PS, Input 1 is hard-wired to a value of '1.' Those skilled in the art will appreciate that in other embodiments, the value of Input 1 may be hard-wired to a value of '0' in the case that the value of n for the circuit (93) represents the least significant bit in PS.

Figure 8:
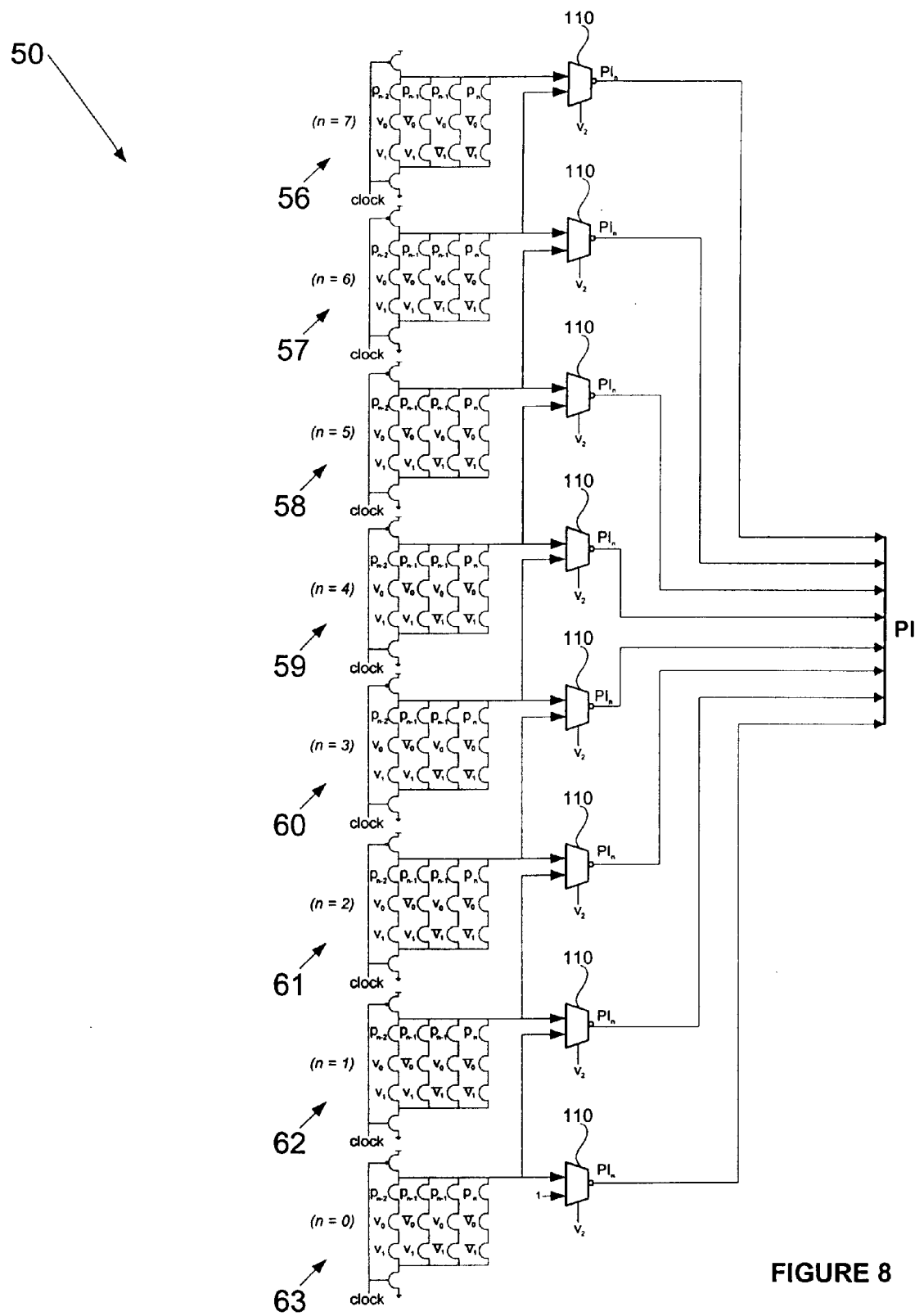
FIG. 8 shows a circuit diagram of a functional block of a popcount/shift circuit in accordance with an embodiment of the present invention.

FIG. 8 shows a circuit diagram of the first functional block (50) of an exemplary embodiment of the present invention. In this exemplary embodiment, the first functional block (50) comprises 8 representative circuits (56, 57, 58, 59, 60, 61, 62, 63), wherein each representative circuit (56, 57, 58, 59, 60, 61, 62, 63) has a similar configuration as the circuit (53) discussed with reference to FIG. 4. However, each representative circuit (56, 57, 58, 59, 60, 61, 62, 63) is distinguished due to the fact that they each have a different n value, and therefore, use different bits in P to determine the value of their respective dynamic nodes.

The values of n that may be used by the representative circuits (56, 57, 58, 59, 60, 61, 62, 63) in this exemplary embodiment range from 0 to 7 since the first functional block (50) generates 8 bits ($PI_0$, $PI_1$, $PI_2$, $PI_3$, $PI_4$, $PI_5$, $PI_6$, $PI_7$) for PI. Each representative circuit (56, 57, 58, 59, 60, 61, 62, 63) generates a particular bit value in PI, wherein all the bits generated by the first functional block (50) form PI. Those skilled in the art will appreciate that in other embodiments, the number of representative circuits having a similar configuration as the circuit (53) shown in FIG. 4 within the first functional block (50) may differ depending upon the number of bits used to represent P and the number of bits needed to represent PI.

Figure 9:
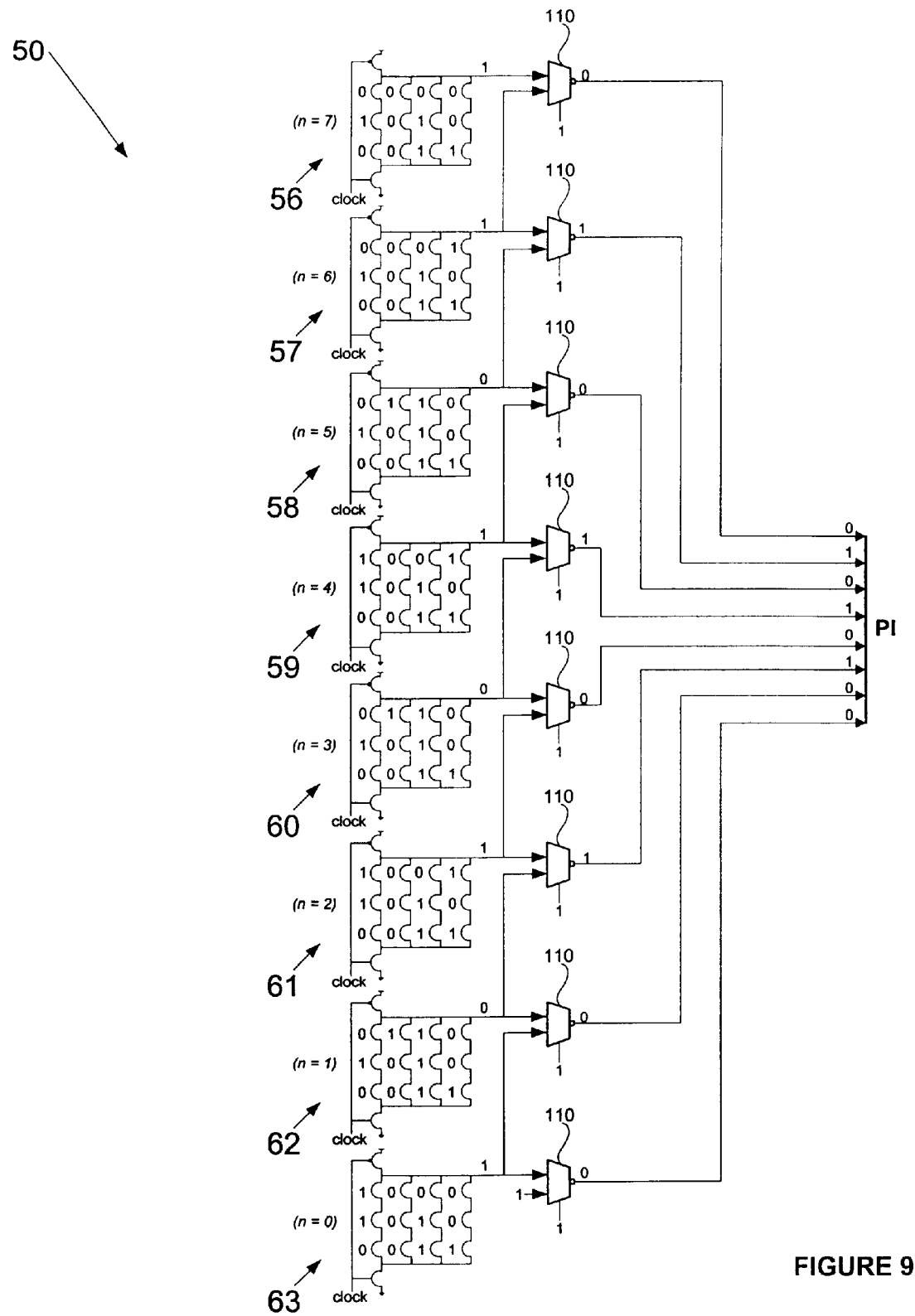
FIG. 9 shows an exemplary circuit process of a functional block of a popcount/shift circuit in accordance with an embodiment of the present invention.

FIG. 9 shows an exemplary circuit process of the first functional block (50) in accordance with the present invention. For this exemplary process, P is represented by 10101 and V is represented by 11010101.

Although the discussion with reference to FIG. 9 will primarily deal with the n=5 circuit (58), those skilled in the art will appreciate that the same procedure and discussion can be applied to the other circuits (56, 57, 59, 60, 61, 62, 63) within the first functional block (50). The n=5 circuit (58) in the first functional block (50) generates the 6$^{th}$ bit in PI ($PI_5$). Of the four strings of devices within the n=5 circuit (58), one string has all of its devices represented by a high value ("1"). Therefore, each device within that string represents a short circuit, and the string as a whole accordingly represents a short circuit. Consequently, the dynamic node of the n=5 circuit (58) is connected to the virtual ground node of the n=5 circuit (58), and the dynamic node is pulled to the virtual ground voltage of 0.

The static multiplexor (110) for the n=5 circuit (58) uses the value of the dynamic node of the n=5 circuit (58) as its Input 0. Moreover, the value of the dynamic node of the n=5 circuit (58) serves as Input 1 to a multiplexor (110) of the n=6 circuit (57).

The static multiplexor (110) of the n=5 circuit (58) uses the value of the dynamic node from the n=4 circuit (59) for its Input 1. For Select Input, all the static multiplexors (110) shown in FIG. 9 use the same third bit from V ($V_2$).

In this exemplary embodiment, $v_0$ is 1, $v_1$ is 0, and $v_2$ is 1. Thus, since two of the three bits used by the first functional block (50) are high, the circuitry in the first functional block (50) should shift P two bit positions. As shown in FIG. 9, the representative circuits (56, 57, 58, 59, 60, 61, 62, 63) of the first functional block (50) each generate a bit to form PI. In this exemplary process, PI is generated as 01010100, which represents the value of P ('10101') when it is incremented by two one-bit position shifts. Those skilled in the art will appreciate that in other embodiments, different bit positions in V may be used to denote $v_0$, $v_1$, and $v_2$.

Figure 10:
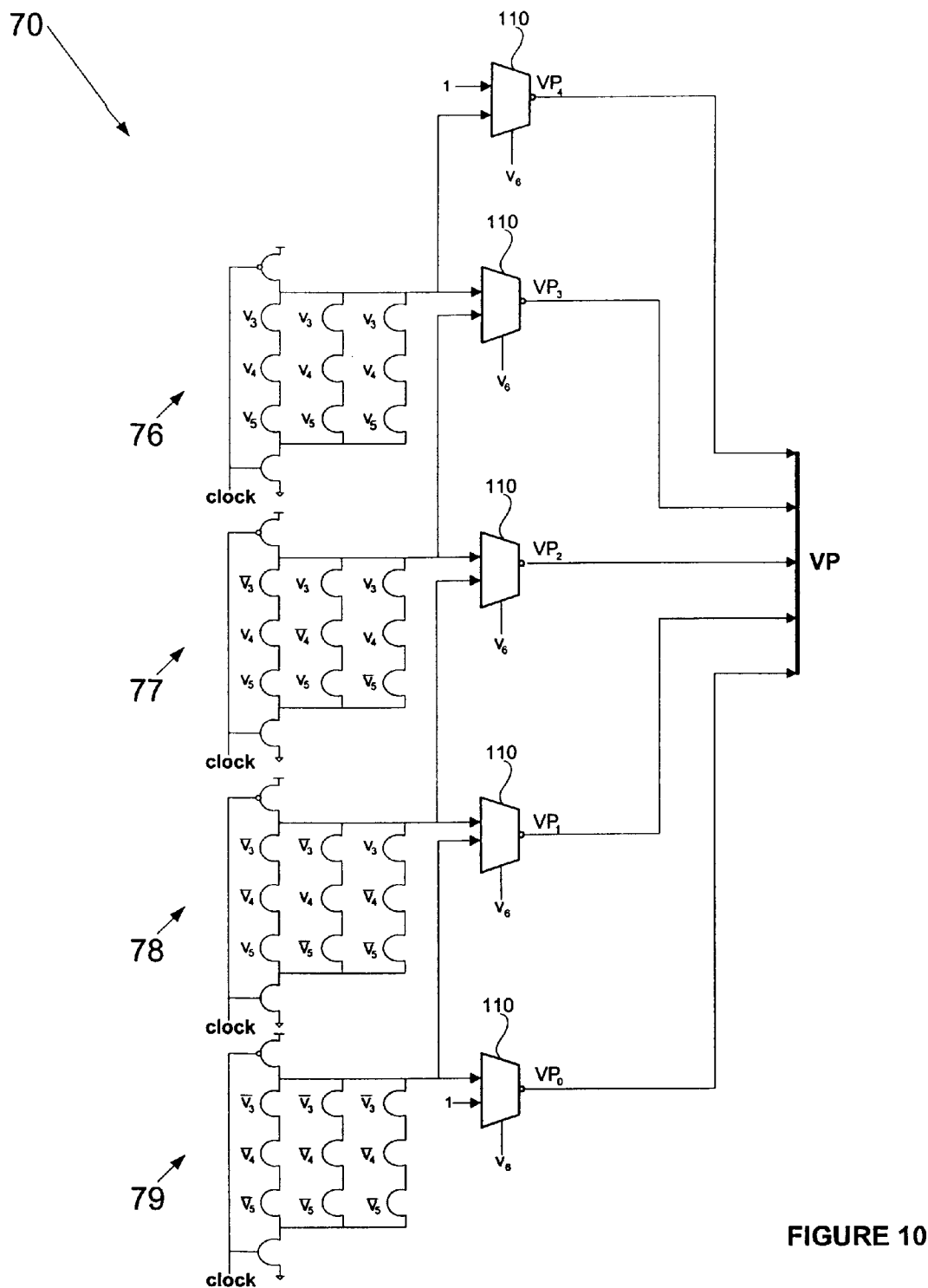
FIG. 10 shows a circuit diagram of a functional block of a popcount/shift circuit in accordance with an embodiment of the present invention.

FIG. 10 shows a circuit diagram of the second functional block (70) of an exemplary embodiment of the present invention. In this exemplary embodiment, the second functional block (70) comprises 4 representative circuits (76, 77, 78, 79) in addition to additional circuitry, wherein each representative circuit (76, 77, 78, 79) has a similar configuration as the circuit (73) discussed in reference to FIG. 6. However, each representative circuit (76, 77, 78, 79) is distinguished due to the fact that they each use different values for their devices. For example, in the representative circuit (78) that is used to generate the second bit in VP ($VP_1$), exactly one bit in a string within that circuit (78) must be high and the bits for the remaining two devices in that string must be low in order to affect the value of the dynamic node of that representative circuit (78).

Each representative circuit (76, 77, 78, 79) generates a particular bit in VP. However, the most significant bit in VP is generated using either the dynamic node value from the representative circuit (76) that generates the next most significant bit or a value of '1' that is hard-wired to a static multiplexor (110) based on the value at Select Input of the static multiplexor (110) that generates the most significant bit in VP. Those skilled in the art will appreciate that in other embodiments, the number of representative circuits having a similar configuration as the circuit (73) shown in FIG. 6 may differ depending upon the amount of bits popcounted by the second functional block (70).

Figure 11:
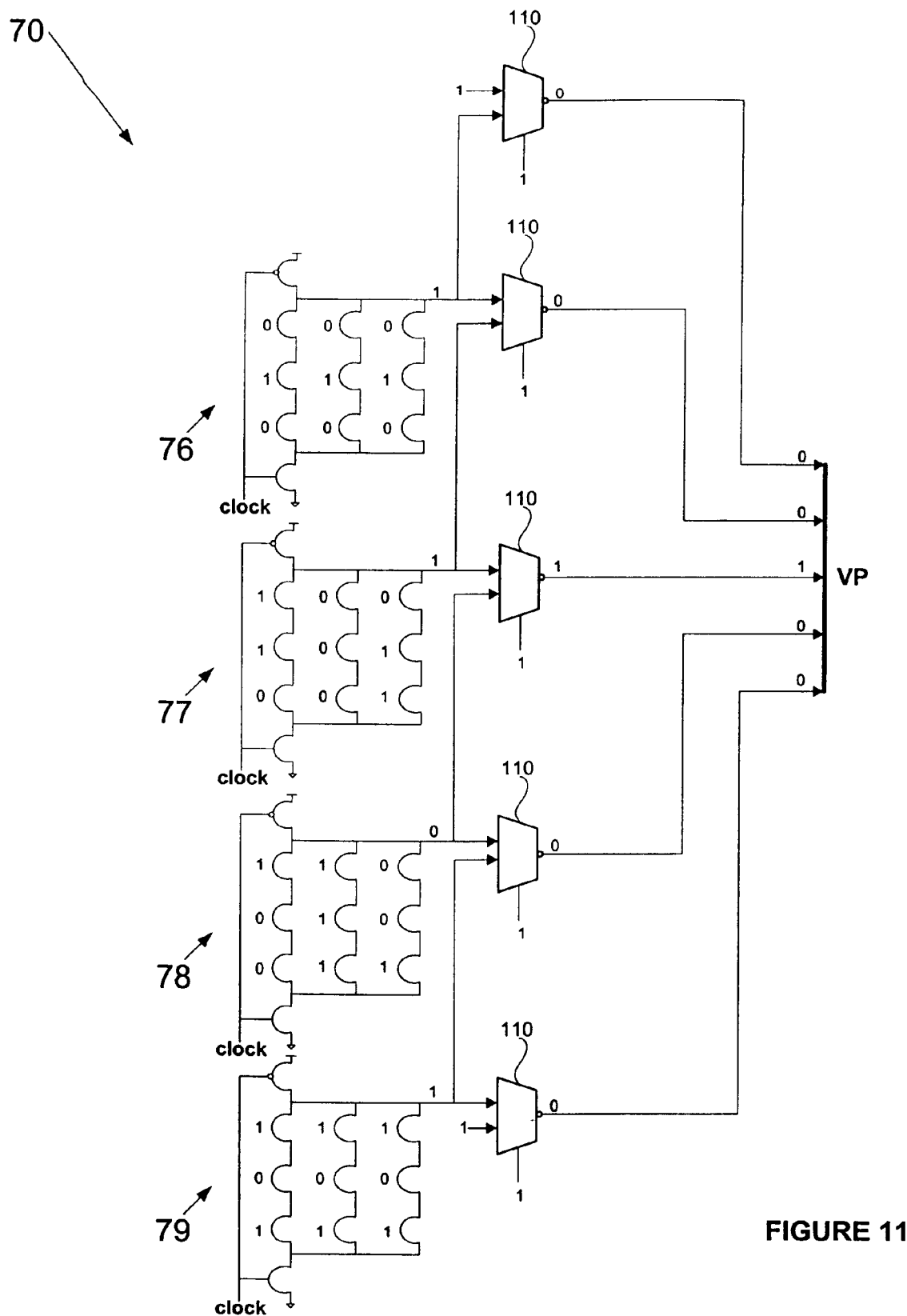
FIG. 11 shows an exemplary circuit process of a functional block of a popcount/shift circuit in accordance with an embodiment of the present invention.

FIG. 11 shows an exemplary circuit process of the second functional block (70) in accordance with the present invention. For this exemplary process, V is represented by 11010101, where $V_3$ is 0, $V_4$ is 1, $V_5$ is 0, and $V_6$ is 1. Those skilled in the art will appreciate that in other embodiments, $V_3$, $V_4$, $V_5$, and $v_6$ may denote different bits in V.

Although the discussion in reference to FIG. 11 will primarily deal with the representative circuit (77) that generates the third bit in VP ($VP_2$), those skilled in the art will appreciate that the same procedure and discussion can be applied to the other representative circuits (76, 78, 79). Of the three strings of devices within the representative circuit (77), all of them contain a device that has a value of '0'. Therefore, all three strings of devices represent open circuits, and the dynamic node of the circuit (77) remains high ('1').

The static multiplexor (110) for the circuit (77) uses the value of the dynamic node of the circuit (77) as its Input 0. Moreover, the value of the dynamic node of the circuit (77) serves as Input 1 to the static multiplexor (110) of the circuit (76) that generates the fourth bit in VP ($VP_3$).

The static multiplexor (110) for the circuit (77) uses the value of the dynamic node from the circuit (78) that generates the second bit in VP ($VP_1$) as its Input 1. For Select Input, all the static multiplexors (110) in FIG. 11 use the same seventh bit from V ($vp_6$).

For this exemplary circuit process, two of the four bits in V that the second functional block (70) uses are high, and therefore, VP is represented by 00100, wherein the '1' in the third bit position ($VP_2$) indicates that two bits are high.

Figure 12:
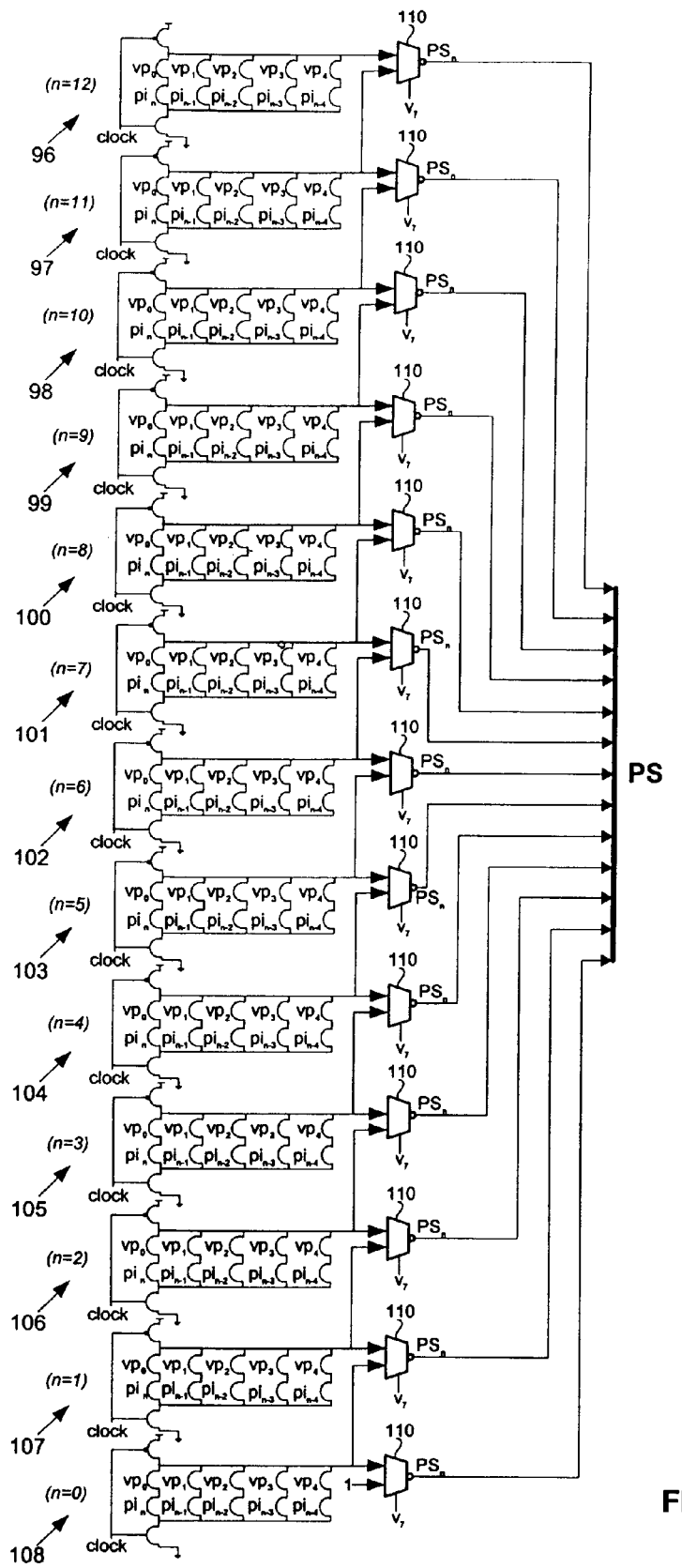
FIG. 12 shows a circuit diagram of a functional block of a popcount/shift circuit in accordance with an embodiment of the present invention.

FIG. 12 shows a circuit diagram for the third functional block (90) of an exemplary embodiment of the present invention. In this exemplary embodiment, the third functional block (90) comprises 13 representative circuits (96, 97, 98, 99, 100, 101, 102, 103, 104, 105, 106, 107, 108), wherein each representative circuit (96, 97, 98, 99, 100, 101, 102, 103, 104, 105, 106, 107, 108) has a similar configuration as the circuit (93) discussed in reference to FIG. 7. However, each representative circuit (96, 97, 98, 99, 100, 101, 102, 103, 104, 105, 106, 107, 108) is distinguished due to the fact that they each have a different n value, and therefore, use different bits in PI to determine the value of their respective dynamic nodes.

The values of n that may be used by the representative circuits (96, 97, 98, 99, 100, 101, 102, 103, 104, 105, 106, 107, 108) in the exemplary embodiment range from 0 to 12 since the third functional block (90) generates 13 bits ($PS_0$, $PS_1$, $PS_2$, $PS_3$, $PS_4$, $PS_5$, $PS_6$, $PS_7$, $PS_8$, $PS_9$, $PS_{10}$, $PS_{11}$, $PS_{12}$) for PS. Each representative circuit (96, 97, 98, 99, 100, 101, 102, 103, 104, 105, 106, 107, 108) generates a particular bit value in PS, wherein all the bits generated by the third functional block (90) form PS. Those skilled in the art will appreciate that in other embodiments, the number of representative circuits having a similar configuration as the circuit (93) shown in FIG. 7 within the third functional block (90) may differ depending upon the number of bits used to represent P and the number of bits needed to represent PS.

Figure 13:
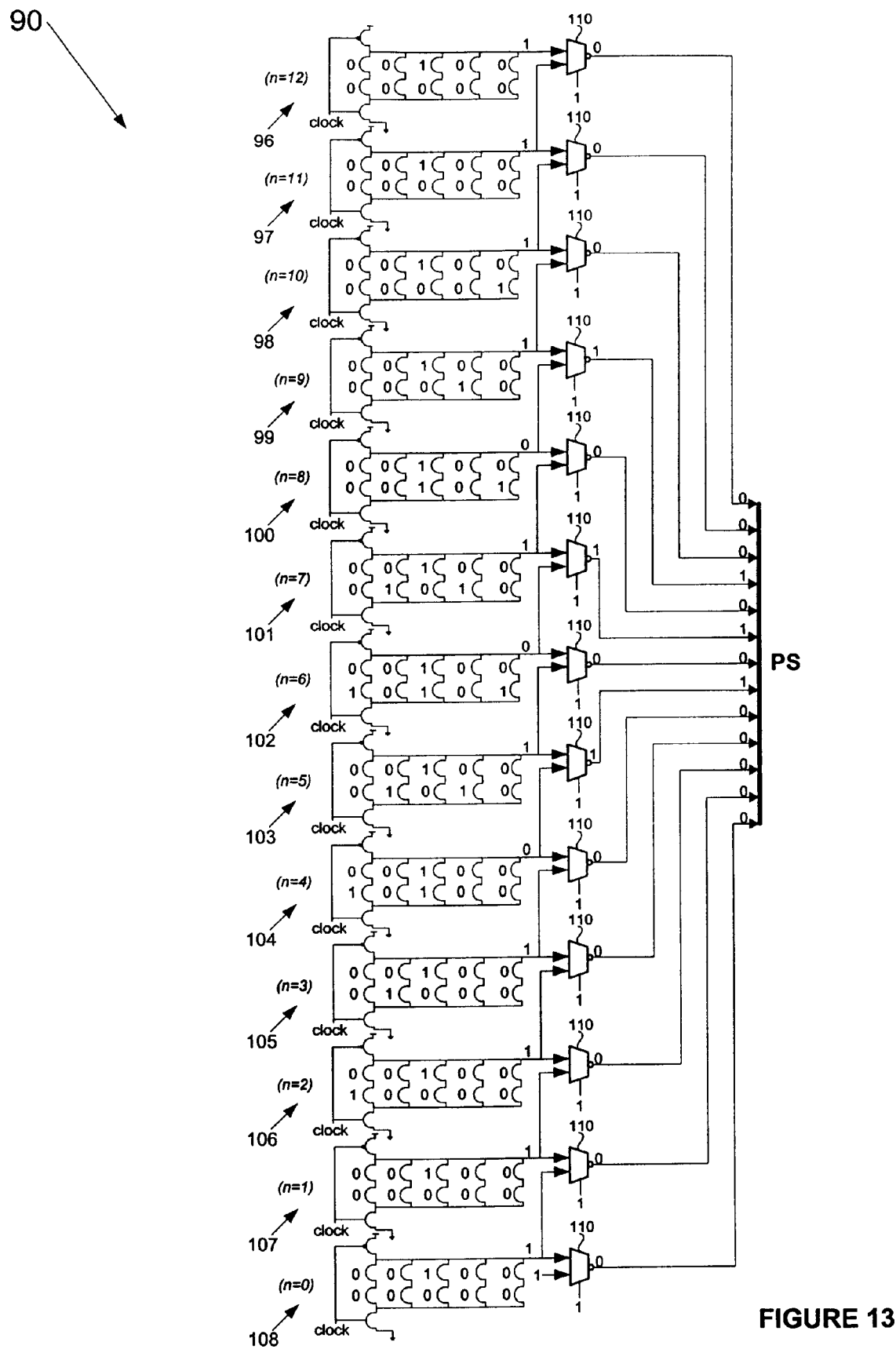
FIG. 13 shows an exemplary circuit process of a functional block of a popcount/shift circuit in accordance with an embodiment of the present invention.

FIG. 13 shows an exemplary circuit process of the third functional block (90) in accordance with the present invention. For this exemplary process, PI is represented by 01010100 and VP is represented by 00100.

Although the discussion with reference to FIG. 13 will primarily deal with the n=0 circuit (108), those skilled in the art will appreciate that the same procedure and discussion can be applied to other circuits (96, 97, 98, 99, 100, 101, 102, 103, 104, 105, 106, 107). The n=0 circuit (108) in the third functional block (90) generates the $1^{st}$ bit in PS ($PS_0$). Of the five strings of devices within the n=0 circuit (108), none of the strings constitute a short circuit. Consequently, the dynamic node of the n=0 circuit (108) remains high ('1) since there is no connection between the dynamic node of the n=0 (108) circuit and the virtual ground node of the n=0 circuit (108).

The static multiplexor (110) for the n=0 circuit (108) uses the value of the dynamic node of the n=0 circuit (108) as its Input 0. Moreover, the value of the dynamic node of the n=0 circuit (108) serves as Input 1 to a static multiplexor (110) for the n=1 circuit (109). The static multiplexor (110) for the n=0 circuit (108) uses the hard-wired value of '1' for its Input 1 since the n=0 circuit (108) generates the least significant bit in PS. For Select Input, all static multiplexors (110) in FIG. 13 use the same eight bit from V ($V_7$).

In this exemplary process, because $V_7$ is 1 and VP represents two more high bits in V, PI is shifted a total of three bit positions. As shown in FIG. 13, the representative circuits (96, 97, 98, 99, 100, 101, 102, 103, 104, 105, 106, 107, 108) of the third functional block (90) each generate a bit to form PS. Accordingly, PS is generated as 0001010100000, which represents the value of P ('10101') when it is incremented by five bit shifts (due to five high bits in V). Those skilled in the art will appreciate that in other embodiments, a different bit in V may be used to denote $V_7$.

Referring to the discussion above with references to FIGS. 3, 4, 5, 6, 7, 8, 9, 10, 11, 12, and 13, those skilled in the art will appreciate that in other embodiments, a different amount of pointer bits and sparse vector bits can be used, which, in effect might require the topology of the two-stage dynamic popcount/shift circuit (42) to change in accordance with the present invention. For example, the number of stages involved in the dynamic popcount/shift circuit may differ dependent upon the amount of bits in the sparse vector and pointer.

Advantages of the present invention may include one or more of the following. In one or more embodiments of the present invention, the popcount function is integrated with the bit shift function to reduce the amount of sparse vector bits remaining to be popcounted.

In some embodiments, the popcount and shift operations occur in parallel, thus allowing remaining sparse vector bits to be counted in parallel with a shift operation.

In one or more embodiments of the present invention, the dynamic popcount/shift circuit allows inputs to be moved around between different pointers to balance the input loads of the multiple circuits within the dynamic popcount/shift circuit.

In some embodiments, one bit is distributed into a multiplexor on the output of the dynamic stage. This increases the number of vector bits that can be popcounted without dynamically increasing the number of bits remaining to be generated by the multiplexors in the dynamic stage.

Another advantage of the present invention is that it increases the computational efficiency and speed at which a pointer can be incremented.

In other embodiments, dynamic popcount/shift circuit can use differing amounts of stages dependent upon the amount of bits in the sparse vector, the amount of bits in the pointer, or other particular system needs.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for integrating population count operations with bit shift operations, comprising:

inputting a plurality of bits from a first vector;

inputting another plurality of bits from a second vector;

performing a population count operation on the plurality of bits from the second vector;

performing a bit shift operation on the plurality of bits from the first vector dependent upon the population count operation; and generating a third vector based on the bit shift operation.

2. The method of claim 1, wherein the third vector represents a value of the plurality of bits from the first vector incremented by a result of the population count operation on the plurality of bits from the second vector.

3. The method of claim 1, further comprising:

using individual bits in the plurality of bits from the first vector and individual bits in the plurality of bits from the second vector for a plurality of devices.

4. The method of claim 3, further comprising:

using a device in the plurality of devices to represent a value dependent upon an individual bit in the plurality of bits from the first vector.

5. The method of claim 3, further comprising:

using a device in the plurality of devices to represent a value dependent upon an individual bit in the plurality of bits from the second vector.

6. The method of claim 3, wherein individual devices in the plurality of devices represent open circuits and short circuits dependent upon values which the individual devices represent.

7. The method of claim 1, further comprising:

using a plurality of devices to form a branch.

8. The method of claim 7, wherein the branch comprises a series of the plurality of devices.

9. The method of claim 7, further comprising:

connecting one terminal of the branch to a dynamic node; and connecting another terminal of the branch to a ground node.

10. The method of claim 9, further comprising:

connecting a set of terminals of a plurality of branches to the dynamic node; and connecting another set of terminals of the plurality of branches to the ground node.

11. The method of claim 10, wherein an individual branch in the plurality of branches constitutes an open circuit when at least one of the plurality of devices that form the branch represents an open circuit, and wherein the individual branch in the plurality of branches constitutes a short circuit when the plurality of devices that form the branch represent short circuits.

12. The method of claim 11, further comprising:

generating a high value for the dynamic node when individual branches in the plurality of branches represent open circuits.

13. The method of claim 11, further comprising:

generating a low value for the dynamic node when at least one individual branch in the plurality of branches represents a short circuit.

14. The method of claim 9, further comprising:

inputting a value of the dynamic node into a second circuit;

inputting a value of another dynamic node into the second circuit;

and inputting a value of a select input.

15. The method of claim 14, wherein the second circuit generates a value for a bit position in the third vector, and wherein a first circuit that comprises the dynamic node has an index value equal to that of an index value of the second circuit.

16. The method of claim 15, wherein the other dynamic node is part of another first circuit that has an index value less than that of the index value of the second circuit.

17. The method of claim 15, further comprising:

inputting pluralities of bits from additional vectors when additional circuits that have configurations like that of the first circuit and second circuit are used.

18. The method of claim 15, further comprising:

balancing input loads of a plurality of first circuits and a plurality of second circuits to increase computational efficiency.

19. The method of claim 15, wherein the index value corresponds to a bit position in the third vector.

20. The method of claim 14, wherein the select input comes from a bit in the plurality of bits from the second vector.

21. The method of claim 14, wherein the second circuit comprises AND gates and OR gates, the method further comprising:

inputting the value of the dynamic node into an input of a first AND gate;

inputting the value of the other dynamic node into an input of a second AND gate;

inputting an inverted value of the select input into another input of the first AND gate; and inputting the value of the select input into another input of the second AND gate.

22. The method of claim 21, wherein the first AND gate outputs to an input of an OR gate, and wherein the second AND gate outputs to another input of the OR gate, the method further comprising:

generating an output from the OR gate;

selectively inverting the output from the OR gate; and using the output from the OR gate to determine a value for a bit position in the third vector.

23. The method of claim 1, wherein the first vector is a pointer vector, and wherein the second vector is a sparse vector, and wherein the third vector is a shifted bit vector.

24. The method of claim 1, wherein the method for integrating population count operations with bit shift operations is used to increment a pointer by performing a population count of a sparse vector.

25. An apparatus for integrating population count circuitry and bit shift circuitry; comprising:

means for inputting a plurality of bits from a first vector;

means for inputting another plurality of bits from the second vector;

means for performing a population count on the plurality of bits from the first vector;

means for performing a bit shift operation on the plurality of bits from the second vector based on a result of the population count;

means for generating a third vector based on the bit shift operation.

26. The apparatus of claim 25, further comprising:

means for using individual bits in the plurality of bits from the first vector and individual bits in the plurality of bits from the second vector for a plurality of devices.

27. The apparatus of claim 26, further comprising:
means for using a device in the plurality of devices to represent a value dependent upon an individual bit in the plurality of bits from the first vector.

28. The apparatus of claim 26, further comprising:
means for using a device in the plurality of devices to represent a value dependent upon an individual bit in the plurality of bits from the second vector.

29. The apparatus of claim 25, the method further comprising:
means for using a plurality of devices to form a branch.

30. The apparatus of claim 29, wherein the branch comprises a series of the plurality of devices.

31. The apparatus of claim 29, further comprising:
means for connecting one terminal of the branch to a dynamic node; and
means for connecting another terminal of the branch to a ground node.

32. The apparatus of claim 31, further comprising:
means for connecting a set of terminals of a plurality of branches to the dynamic node; and
means for connecting another set of terminals of the plurality of branches to the ground node.

33. The apparatus of claim 32, further comprising:
means for generating a high value for the dynamic node when individual branches in the plurality of branches represent open circuits.

34. The apparatus of claim 32, further comprising:
means for generating a low value for the dynamic node when at least one individual branch in the plurality of branches represents a short circuit.

35. The apparatus of claim 31, further comprising:
means for inputting a value of the dynamic node into a second circuit;
means for inputting a value of another dynamic node into the second circuit; and
means for inputting a value of a select input.

36. The apparatus of claim 35, wherein the second circuit generates a value for a bit position in the third vector, and wherein a first circuit that comprises the dynamic node has an index value equal to that of an index value of the second circuit.

37. The apparatus of claim 36, wherein the other dynamic node is part of another first circuit that has an index value less than that of the index value of the second circuit.

38. The apparatus of claim 35, wherein the select input comes from a bit in the plurality of bits from the second vector.

39. The apparatus of claim 35, wherein the second circuit comprises AND gates and OR gates, the apparatus further comprising:
means for inputting the value of the dynamic node into an input of a first AND gate;
means for inputting the value of the other dynamic node into an input of a second AND gate;
means for inputting an inverted value of the select input into another input of the first AND gate; and
means for inputting the value of the select input into another input of the second AND gate.

40. The apparatus of claim 39, wherein the first AND gate outputs to an input of an OR gate, and wherein the second AND gate outputs to another input of the OR gate, the method further comprising:
means for generating an output from the OR gate;
means for selectively inverting the output from the OR gate; and
means for using the output from the OR gate to determine a value for a bit position in the third vector.

41. The apparatus of claim 25, wherein the first vector is a pointer vector, and wherein the second vector is a sparse vector, and wherein the third vector is a shifted bit vector.

42. The apparatus of claim 25, wherein the apparatus for integrating population count circuitry and bit shift circuitry is used to increment a pointer by performing a population count of a sparse vector.

43. The apparatus of claim 25, wherein the apparatus can be expanded through circuit repetition in accordance to a different amount of bits in the first vector and the second vector.

* * * * *

UNITED STATES PATENT AND TRADEMARK OFFICE
CERTIFICATE OF CORRECTION

PATENT NO. : 6,754,685 B2
DATED : June 22, 2004
INVENTOR(S) : Matthew E. Becker

It is certified that error appears in the above-identified patent and that said Letters Patent is hereby corrected as shown below:

Column 13,
Line 1, insert between "operation" and "on" the phrase -- , in parallel with said performing a population count operation, --.

Column 14,
Line 58, insert between "operation" and "on" the phrase -- , in parallel with said means for performing a population count, --.

Signed and Sealed this

Twenty-first Day of September, 2004

JON W. DUDAS
*Director of the United States Patent and Trademark Office*